United States Patent [19]
Park

[11] Patent Number: 5,572,550
[45] Date of Patent: Nov. 5, 1996

[54] DECISION DIRECTED CARRIER RECOVERY CIRCUIT USING PHASE ERROR DETECTOR

[75] Inventor: Sung K. Park, Seoul, Rep. of Korea

[73] Assignee: Hyundai Electronics Industries, Co., Ltd., Kyoungki-Do, Rep. of Korea

[21] Appl. No.: 359,585

[22] Filed: Dec. 20, 1994

[30] Foreign Application Priority Data

Dec. 29, 1993 [KR] Rep. of Korea .................. 93-30554

[51] Int. Cl.$^6$ ................ H03D 3/00; H03D 3/02; H03D 3/24
[52] U.S. Cl. .................. 375/326; 375/327; 375/375; 327/141; 327/156
[58] Field of Search .................. 375/344, 373, 375/371, 375, 376, 374, 324, 329, 326, 332, 327, 261, 340, 341, 328; 455/182.1, 182.2; 327/155, 156, 2, 3, 8, 12, 39, 72, 73, 141, 155, 156, 162, 163; 331/1 R, 172; 329/304, 306, 307–310

[56] References Cited

U.S. PATENT DOCUMENTS

| | | | |
|---|---|---|---|
| 4,466,109 | 8/1984 | Sari | 375/332 |
| 4,871,975 | 10/1989 | Nawata et al. | 329/124 |
| 5,150,384 | 9/1992 | Cahill | 375/314 |
| 5,184,091 | 2/1993 | Srivastava | 331/10 |
| 5,272,730 | 12/1993 | Clark | 375/376 |

*Primary Examiner*—Young T. Tse
*Assistant Examiner*—Bryan E. Webster
*Attorney, Agent, or Firm*—Fish & Richardson, P.C.

[57] ABSTRACT

A decision directed carrier recovery circuit comprising a demodulator for adjusting a frequency and a phase of an input carrier to demodulate an original signal therefrom, a signal decision unit for deciding an output signal from the demodulator as a specified symbol, and a phase error detector for receiving the output signal from the demodulation and an output signal from the signal decision unit and detecting an phase error between the received signals using bit shifting instead of division. The phase error detector includes a numerator calculator for receiving the output signal from the demodulator and the output signal from the signal decision unit and calculating a numerator of a phase error calculation expression on the basis of addition and multiplication, a logic combination unit for logically combining first and second components of the output signal from the signal decision unit, and a multiplexer for inputting through a plurality of input terminals values obtained by bit-shifting an output value from the numerator calculator respectively with respect to all possible values of a denominator of the phase error calculation expression and selecting one of the inputted values most approximate to an actual value in response to an output signal from the logic combination unit.

3 Claims, 6 Drawing Sheets

DECISION DIRECTED CARRIER RECOVERY CIRCUIT USING PHASE ERROR DETECTOR

BACKGROUND OF THE INVENTION

1. Field of the Invention

The present invention relates in general to a decision directed carrier recovery circuit using a phase error detector, and more particularly to an improved phase error detector for a decision directed carrier recovery circuit which is mainly used in quadrature amplitude modulation (referred to hereinafter as QAM) of a digital transmission system.

2. Description of the Prior Art

Figure 1:
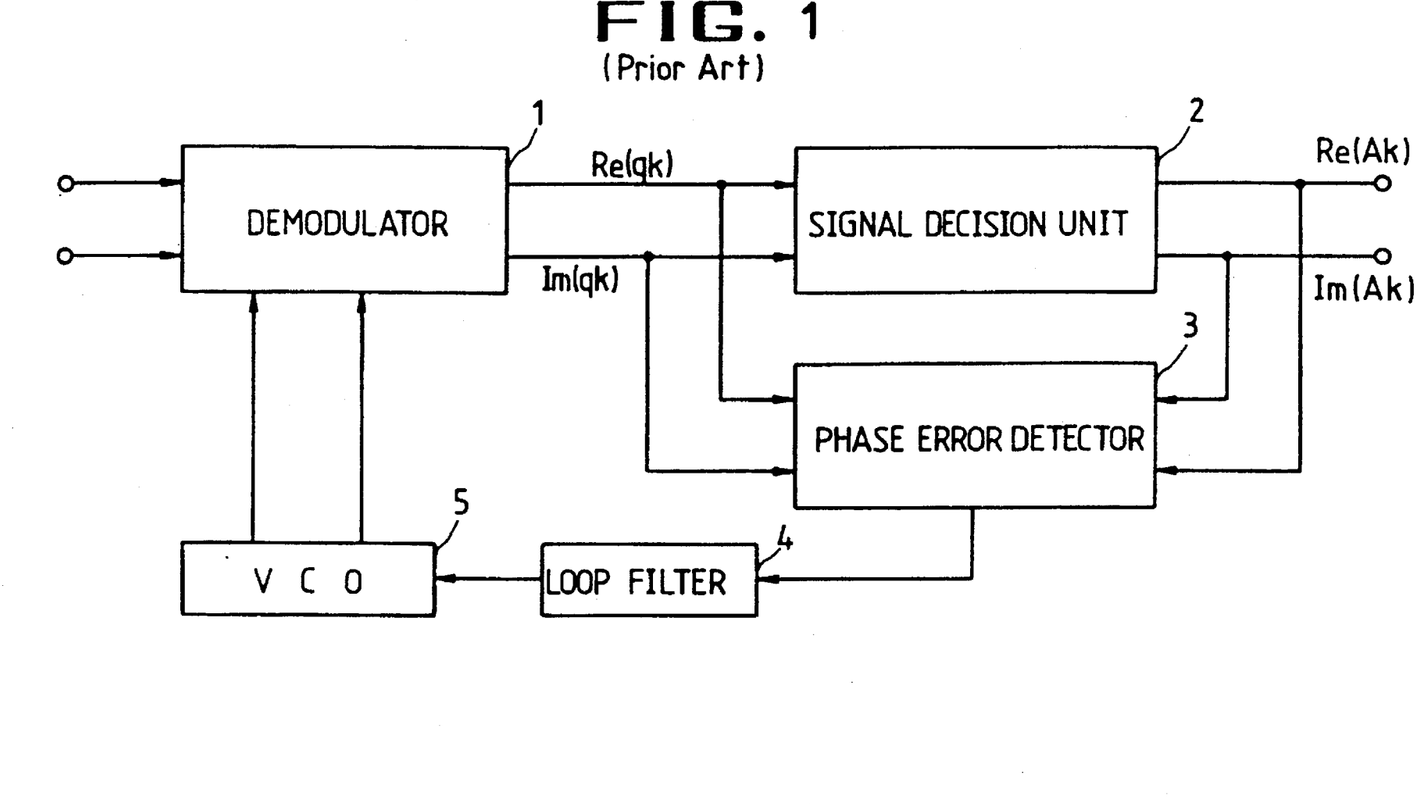
FIG. 1 is a block diagram of a conventional decision directed carrier recovery circuit.

Referring to FIG. 1, there is shown a block diagram of a conventional decision directed carrier recovery circuit. As shown in this drawing, the conventional decision directed carrier recovery circuit comprises a demodulator 1 for adjusting a frequency and a phase of an input carrier to demodulate an original signal therefrom. The demodulator 1 includes a complex multiplier.

The conventional decision directed carrier recovery circuit also comprises a signal decision unit 2 for deciding an output signal [Re($q_k$),Im($q_k$)] from the demodulator 1 as a specified symbol, a phase error detector 3 for performing multiplication and division for the output signal [Re($q_k$), Im($q_k$)] from the demodulator 1 and an output signal [Re($A_k$),Im($A_k$)] from the signal decision unit 2 to detect a phase error therebetween, a loop filter 4 for low pass filtering an output signal from the phase error detector 3, and a voltage controlled oscillator (VCO) 5 for outputting an signal for the adjustment of the frequency and phase of the input carrier to the demodulator 1 in response to an output signal from the loop filter 4. Here, it can be seen that the components in FIG. 1 form a phase locked loop (PLL).

Figure 4:
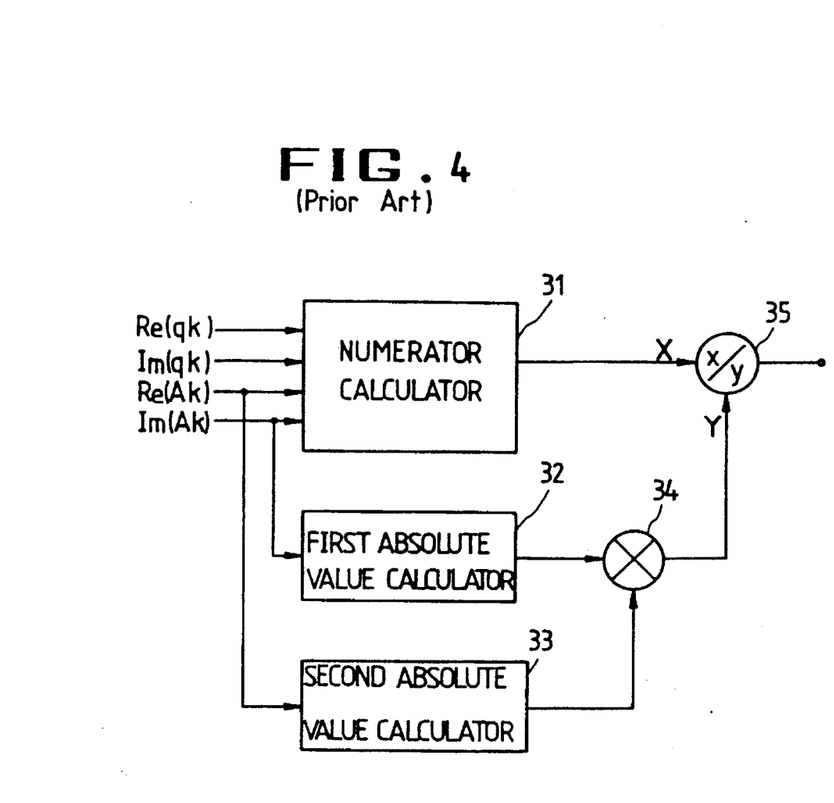
FIG. 4 is a block diagram of a phase error detector in FIG. 1.

Referring to FIG. 4, there is shown a block diagram of the phase error detector 3 in FIG. 1. As shown in this drawing, the phase error detector 3 includes a numerator calculator 31 for receiving the output signal [Re($q_k$),Im($q_k$)] from the demodulator 1 and the output signal [Re($A_k$),Im($A_k$)] from the signal decision unit 2 and calculating a numerator of a phase error calculation expression, a first absolute value calculator 32 for calculating an absolute value of a component Im($A_k$) of the output signal from the signal decision unit 2, a second absolute value calculator 33 for calculating an absolute value of a component Re($A_k$) of the output signal from the signal decision unit 2, a multiplier 34 for multiplying an output value from the first absolute value calculator 32 by an output value from the second absolute value calculator 33, and a divider 35 for dividing an output value X from the numerator calculator 31 by an output value Y from the multiplier 34.

Figure 2:
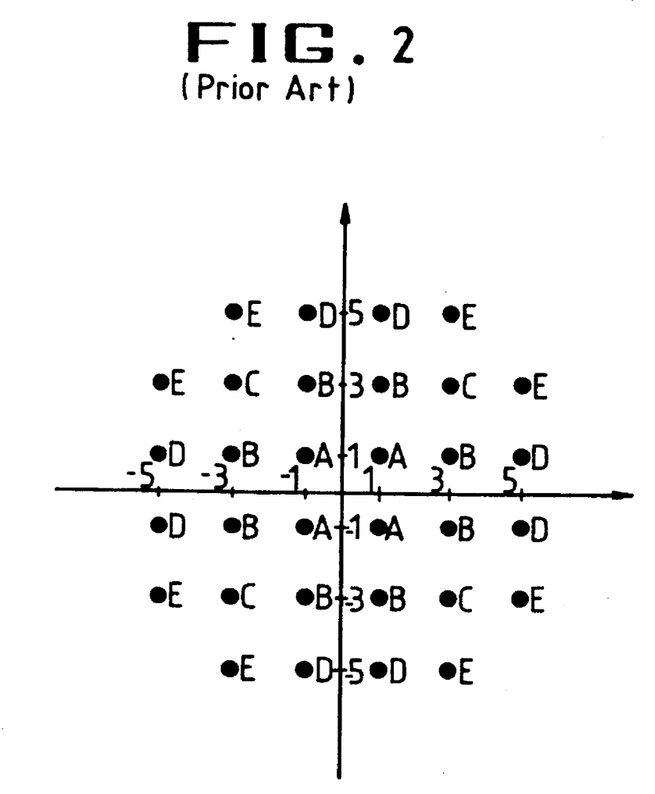
FIG. 2 is a view illustrating a signal constellation of 32-QAM.
Figure 3:
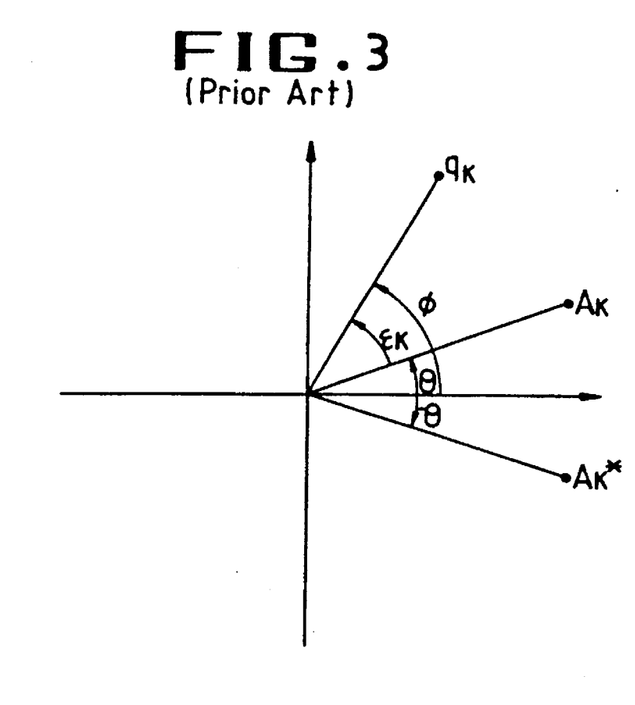
FIG. 3 is a view illustrating a phase error between an original signal and a rotated signal.

The operation of the conventional decision directed carrier recovery circuit with the above-mentioned construction will hereinafter be described with reference to FIGS. 2 and 3. FIG. 2 is a view illustrating a signal constellation of 32-QAM and FIG. 3 is a view illustrating the phase error between the signals $A_k$ and $q_k$.

The signal demodulated by the demodulator 1 including the complex multiplier is decided as the specified symbol by the signal decision unit 2. The output signal from the signal decision unit 2 and the signal demodulated by the demodulator 1 are applied for calculation of the phase error in the phase error detector 3. The resultant signal from the phase error detector 3 is low pass filtered by the loop filter 4 and then applied to the VCO 5, which outputs the signal for the adjustment of the frequency and phase of the input carrier to the demodulator 1 in response to the output signal from the loop filter 4.

Because one of 32 or $2_5$ symbols is transmitted at a time in the 32-QAM as shown in FIG. 2, binary data is transmitted in the unit of 5 bits. The transmitted signal is rotated due to a variation in the frequency and phase resulting from a channel characteristic. A carrier recovery loop is required to compensate for such a rotation. A phase error resulting from the rotation can be obtained on the basis of the principle of FIG. 3. Namely, provided that the original signal $A_k$ is rotated to $q_k$ in the transmission as shown in FIG. 3, multiplication of a conjugate complex number $A_k$* of the original signal $A_k$ and the rotated signal $q_k$ is |$q_k$||$A_k$| and the rotated angle is $\phi-\Theta$. Here, since |$q_k$|=|$A_k$|, |$q_k$||$A_k$|=|$A_k$|$^2$. Also, since the phase error $\epsilon_k=\phi-\Theta$, it can be expressed as follows:

$$\epsilon_k = \sin^{-1}[Im(q_k \cdot A_k^*) / |A_k|^2]$$

Provided that the phase error is very small, $\epsilon_k \approx \sin\epsilon_k$. As a result, the phase error $\epsilon_k$ can be expressed as follows:

$$\epsilon_k = [Im(q_k \cdot A_k^*) / |A_k|^2]$$

However, the conventional phase error detector has a disadvantage in that the divider requires a number of logical elements to perform the division, resulting in an increase in the size and the cost. Also, much time required in the calculation results in a degradation in a performance of the phase locked loop.

On the other hand, a technique for detecting a phase error in a video display apparatus is shown in U.S. Pat. No. 5,184,091. This technique relates to tuning and control devices for a display scan system. In this technique, a control system is provided to allow an oscillator to operate on a broad range of frequency, to prevent generation of an error in frequency and phase of a signal from the oscillator with respect to a reference frequency. In this connection, the above technique does not relates to that to be proposed by the present invention.

SUMMARY OF THE INVENTION

Therefore, the present invention has been made in view of the above problem, and it is an object of the present invention to provide a decision directed carrier recovery circuit in which division required in calculation of a phase error is performed by obtaining a value most approximate to the divided result using bit shifting, so that the construction can be simplified and the calculation time can be shortened, resulting in an improvement in a traceability of a phase locked loop.

In accordance with the present invention, the above and other objects can be accomplished by a provision of a decision directed carrier recovery circuit comprising demodulation means for adjusting a frequency and a phase of an input carrier to demodulate an original signal therefrom; signal decision means for deciding an output signal from said demodulation means as a specified symbol; phase error detection means for receiving the output signal from said demodulation and an output signal from said signal decision means and detecting an phase error between the received signals using bit shifting instead of division; loop filtering means for low pass filtering an output signal from said phase error detection means; and voltage controlled oscillation means for outputting a signal for the adjustment of the frequency and phase of the input carrier to said demodulation means in response to an output signal from said loop filtering means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 5:
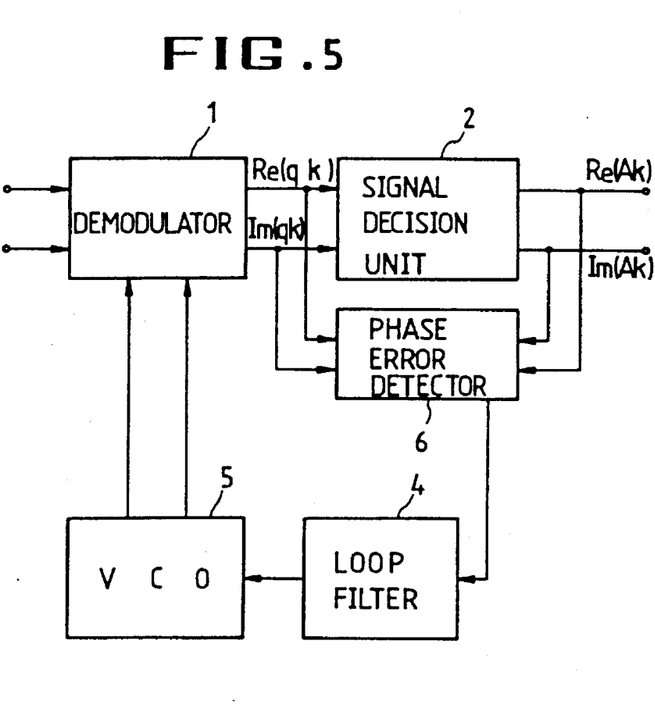
FIG. 5 is a block diagram of a decision directed carrier recovery circuit in accordance with the present invention.

Referring to FIG. 5, there is shown a block diagram of a decision directed carrier recovery circuit in accordance with the present invention. Some of parts in this drawing are the same as those in FIG. 1. Therefore, like reference numerals designate like parts.

As shown in FIG. 5, the decision directed carrier recovery circuit comprises the demodulator 1 which adjusts the frequency and phase of the input carrier to demodulate the original signal therefrom. The demodulator 1 includes the complex multiplier.

The signal decision unit 2 is adapted to decide the output signal [Re($q_k$),Im($q_k$)] from the demodutator 1 as the specified symbol.

The decision directed carrier recovery circuit also comprises a phase error detector 6 for receiving the output signal [Re($q_k$),Im($q_k$)] from the demodulator 1 and the output signal [Re($A_k$),Im($A_k$)] from the signal decision unit 2 and detecting the phase error between the received signals using bit shifting.

The loop filter 4 is adapted to low pass filter an output signal from the phase error detector 6.

The VCO 5 is adapted to output the signal for the adjustment of the frequency and phase of the input carrier to the demodulator 1 in response to the output signal from the loop filter 4.

Figure 6:
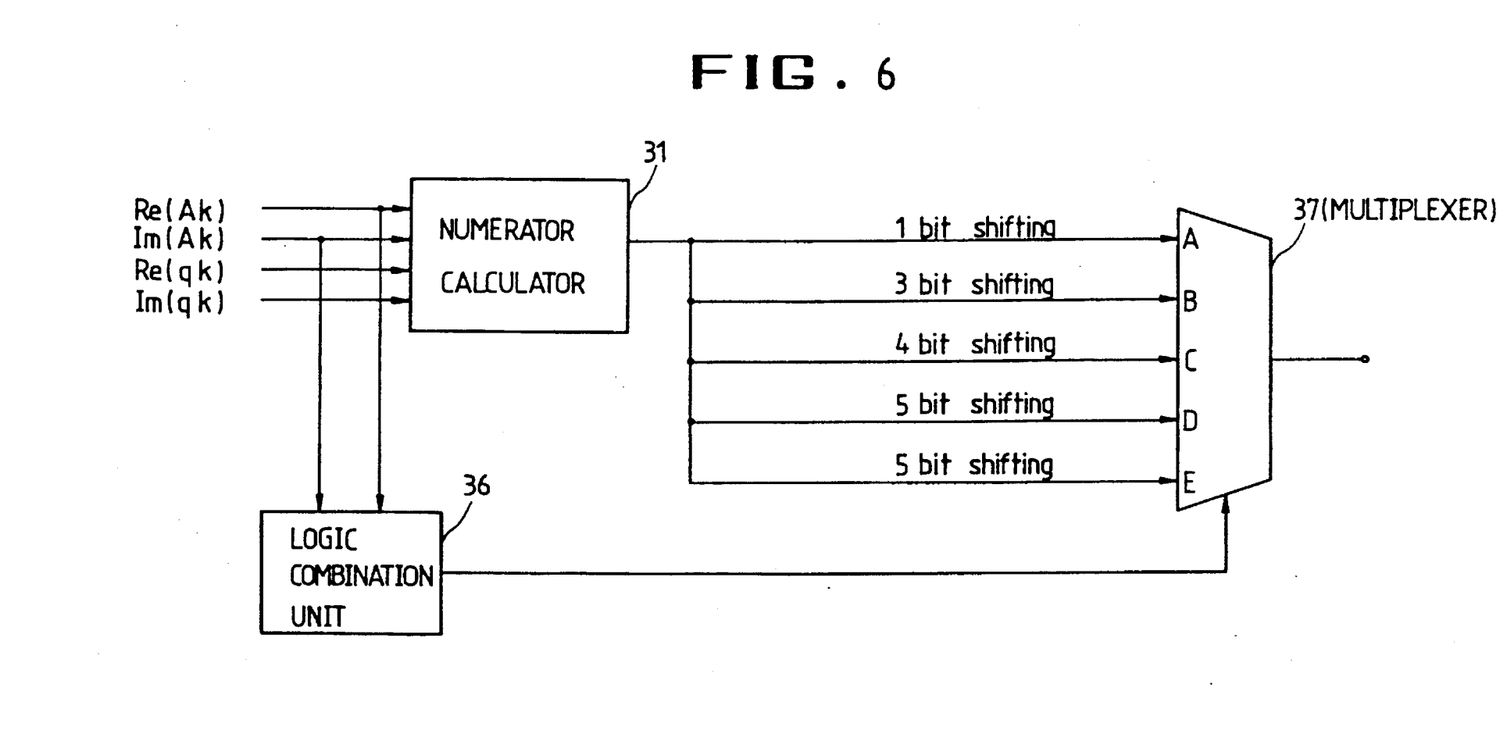
FIG. 6 is a block diagram of a first embodiment of a phase error detector in FIG. 5.

Referring to FIG. 6, there is shown a block diagram of a first embodiment of the phase error detector 6 in FIG. 5. Some of parts in this drawing are the same as those in FIG. 4. Therefore, like reference numerals designate like parts. For example, possible values of the denominator $|A_k|^2$ of the phase error calculation expression are 5 in number in the 32-QAM as shown in FIG. 2.

As shown in FIG. 6, the phase error detector 6 includes the numerator calculator 31 which receives the output signal [Re($q_k$),Im($q_k$)] from the demodulator 1 and the output signal [Re($q_k$),Im($q_k$)] from the signal decision unit 2 and calculates the numerator of the phase error calculation expression on the basis of addition and multiplication.

The phase error detector 6 also includes a logic combination unit 36 for logically combining the components Re($A_k$) and Im($A_k$) of the output signal from the signal decision unit 2, and a multiplexer 37 for inputting through a plurality of input terminals A–E values obtained by bit-shifting an output value from the numerator calculator 31 respectively with respect to all the possible values of the denominator $|A_k|^2$ and selecting one of the inputted values most approximate to an actual value in response to an output signal from the logic combination unit 36. The input terminal A of the multiplexer 37 inputs the value obtained by shifting the output value from the numerator calculator 31 by 1 bit. The input terminal B of the multiplexer 37 inputs the value obtained by shifting the output value from the numerator calculator 31 by 3 bits. The input terminal C of the multiplexer 37 inputs the value obtained by shifting the output value from the numerator calculator 31 by 4 bits. The input terminals D and E of the multiplexer 37 input the value obtained by shifting the output value from the numerator calculator 31 by 5 bits.

In accordance with the present invention, in the calculation of the phase error, the division is performed by obtaining the value most approximate to the divided result using the bit shifting. Namely, the division or multiplication is performed on the basis of $2^N$. The denominator $|A_k|^2$ has 5 possible values, A, B, C, D and E, and values of $2^N$ most approximate to the respective denominator values are given as follows:

|    | $1/|A_k|^2$ | $2^N$   | N  |
|----|-------------|---------|----|
| A: | 1/2         | = 1/2   | −1 |
| B: | 1/10        | = 1/8   | −3 |
| C: | 1/18        | = 1/16  | −4 |
| D: | 1/26        | = 1/32  | −5 |
| E: | 1/34        | = 1/32  | −5 |

Here, the bit shifting is carried out to a least significant bit (LSB) if N is a negative number, whereas to a most significant bit (MSB) if N is a positive number. As a result, the value approximate to the divided result can be obtained by bit-shifting the numerator of the phase error calculation expression by N according to the denominator $|A_k|^2$. The numerator is bit-shifted so that the most approximate values can be obtained with respect to all the possible values of the denominator $|A_k|^2$. The multiplexer 37 selects one of the bit-shifted values according to the denominator $|A_k|^2$. Namely, the output of the multiplexer 37 is controlled according to the denominator $|A_k|^2$, which is provided from the logic combination unit 36 logically combining the components Re($A_k$) and Im($A_k$) of the output signal from the signal decision unit 2. The bit shifting is not performed by shift registers but by connections with the multiplexer 37. For example, in the case where the shifting is to be performed by N bits to obtain the multiplexer 37 output having the same bit length as that of the calculated numerator, the MSB is extended by N bits, whereas N bits beginning with the LSB are removed. Then, the resultant bits are connected to the multiplexer 37.

Figure 7:
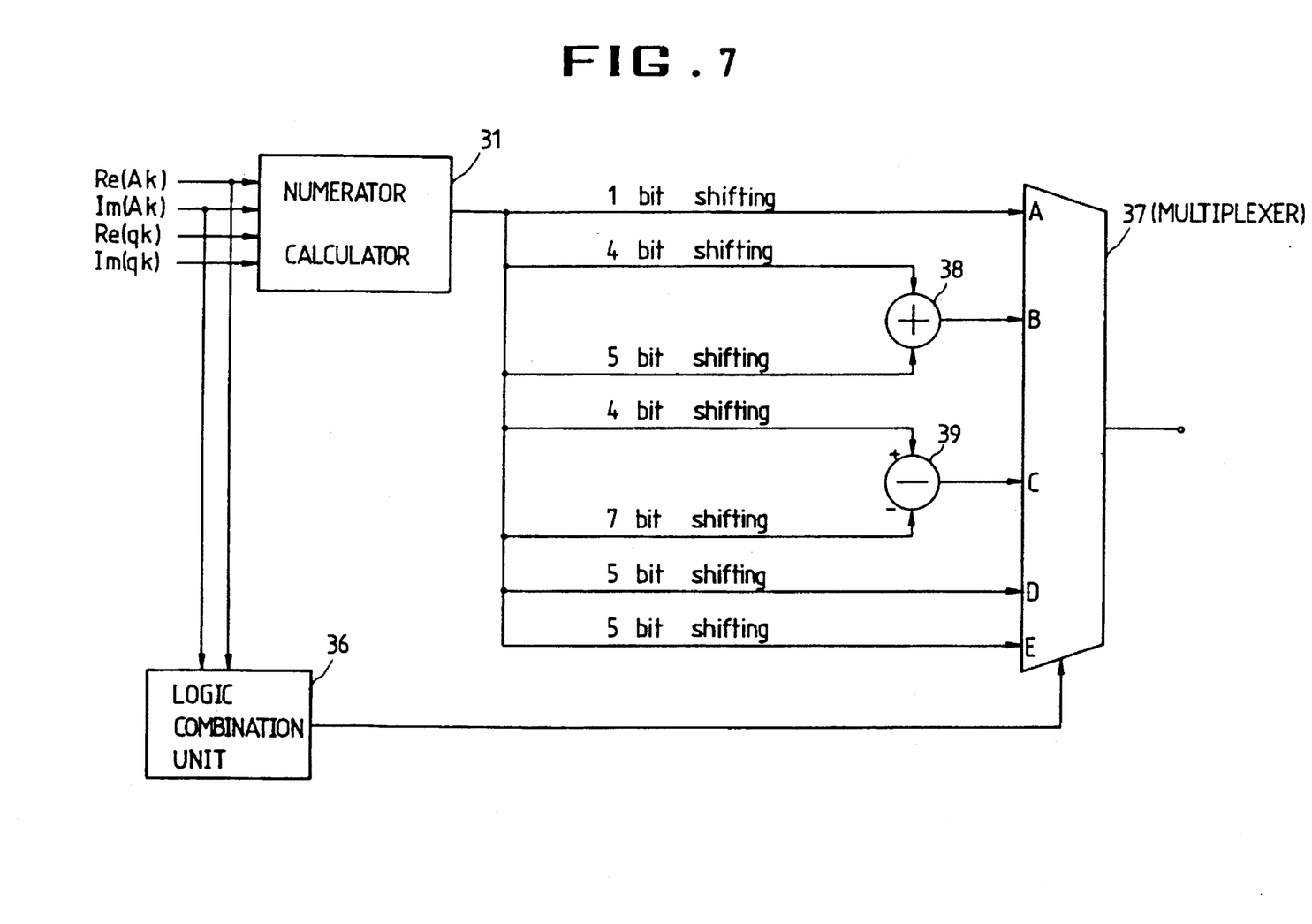
FIG. 7 is a block diagram of a second embodiment of the phase error detector in FIG. 5.

Referring to FIG. 7, there is shown a block diagram of a second embodiment of the phase error detector 6 in FIG. 5. Some of parts in this drawing are the same as those in FIG. 6. Therefore, like reference numerals designate like parts. For example, the possible values of the denominator $|A_k|^2$ of the phase error calculation expression are 5 in number in the 32-QAM as shown in FIG. 2.

As shown in FIG. 7, the phase error detector 6 includes the numerator calculator 31 which receives the output signal [Re($q_k$),Im($q_k$)] from the demodulator 1 and the output signal [Re($A_k$),Im($A_k$)] from the signal decision unit 2 and calculates the numerator of the phase error calculation expression on the basis of addition and multiplication, and the logic combination unit 36 which logically combines the components Re($A_k$) and Im($A_k$) of the output signal from the signal decision unit 2.

The phase error detector 5 also includes an adder 38 for adding a value obtained by shifting the output value from the numerator calculator 31 by 4 bits and a value obtained by shifting the output value from the numerator calculator 31 by 5 bits, and a subtracter 39 for subtracting a value obtained by shifting the output value from the numerator calculator 31 by 7 bits from the value obtained by shifting the output value from the numerator calculator 31 by 4 bits.

The multiplexer 37 is adapted to input through the plurality of input terminals A–E a value obtained by shifting the output value from the numerator calculator 31 by 1 bit, an output value from the adder 38, an output value from the subtracter 39 and a value obtained by shifting the output value from the numerator calculator 31 by 5 bits and select one of the inputted values most approximate to the actual value in response to the output signal from the logic combination unit 36. The input terminal A of the multiplexer 37 inputs the value obtained by shifting the output value from the numerator calculator 31 by 1bit. The input terminal B of the multiplexer 37 inputs the output value from the adder 38 and the input terminal C thereof inputs the output value from the subtracter 39. The input terminals D and E of the multiplexer 37 input the value obtained by shifting the output value from the numerator calculator 31 by 5bits.

The construction and operation of the second embodiment of the phase error detector 6 are substantially the same as those of the first embodiment in FIG. 6, with the exception that the output value from the adder 38 and the output value from the subtracter 39 are applied to the input terminals B and C of the multiplexer 37, respectively. The result of ($1/16$)+($1/32$) is nearer to $1/10$ rather than $1/8$ as the result of shifting the output value from the numerator calculator 31 by 3 bits. Therefore, a value obtained by adding the results of shifting the output value from the numerator calculator 31 respectively by 4 bits and 5 bits is applied to the input terminal B of the multiplexer 37. Also, the result of ($1/16$)−($1/128$) is nearer to $1/18$ rather than $1/16$ as the result of shifting the output value from the numerator calculator 31 by 4 bits. Therefore, a value obtained by performing the subtraction for the results of shifting the output value from the numerator calculator 31 respectively by 4 bits and 7 bits is applied to the input terminal C of the multiplexer 37.

Figure 8:
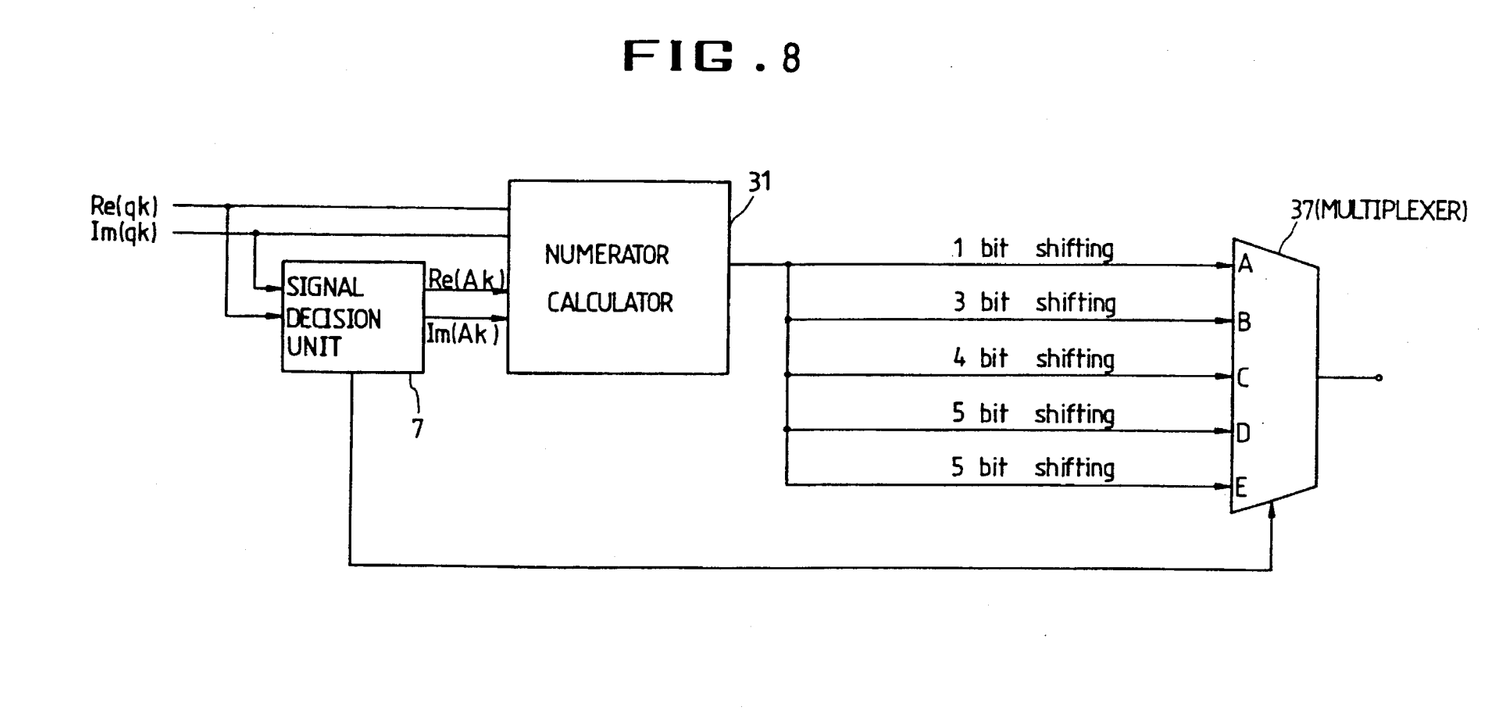
FIG. 8 is a block diagram of a third embodiment of the phase error detector in FIG. 5.

Referring to FIG. 8, there is shown a block diagram of a third embodiment of the phase error detector 6 in FIG. 5. Some of parts in this drawing are the same as those in FIG. 7. Therefore, like reference numerals designate like parts. For example, the possible values of the denominator $|A_k|^2$ of the phase error calculation expression are 5 in number in the 32-QAM as shown in FIG. 2.

In the third embodiment, a signal decision unit 7 including a read only memory (ROM) or a logical combination circuit is used instead of the signal decision unit 2 in FIG. 5 and adapted to provide the signal [Re($A_k$),Im($A_k$)] and apply a control signal to the multiplexer 37.

As shown in FIG. 8, the phase error detector 6 includes the numerator calculator 31 which receives the output signal [Re($q_k$),Im($q_k$)] from the demodulator 1 and the output signal [Re($A_k$),Im($A_k$)] from the signal decision unit 7 and calculates the numerator of the phase error calculation expression on the basis of addition and multiplication.

The multiplexer 37 is adapted to input through the plurality of input terminals A–E the values obtained by bit-shifting the output value from the numerator calculator 31 respectively with respect to all the possible values of the denominator $|A_k|^2$ and select one of the inputted values most approximate to the actual value in response to the control signal from the signal decision unit 7. The input terminal A of the multiplexer 37 inputs the value obtained by shifting the output value from the numerator calculator 31 by 1 bit. The input terminal B of the multiplexer 37 inputs the value obtained by shifting the output value from the numerator calculator 31 by 3 bits. The input terminal C of the multiplexer 37 inputs the value obtained by shifting the output value from the numerator calculator 31 by 4 bits. The input terminals D and E of the multiplexer 37 input the value obtained by shifting the output value from the numerator calculator 31 by 5 bits.

The construction and operation of the third embodiment of the phase error detector 6 are substantially the same as those of the first embodiment in FIG. 6, with the exception that the control signal from the signal decision unit 7 is applied to the multiplexer 37.

In the preferred embodiment of the present invention, the possible values of the denominator $|A_k|^2$ are not limited to 5 in number. As a result, the bits shifted according to the denominator $|A_k|^2$ and the input terminals of the multiplexer 37 may be varied in number.

As apparent from the above description, according to the present invention, the construction can be simplified and the calculation time can be shortened, resulting in an improvement in a traceability of a phase locked loop.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A decision directed carrier recovery circuit comprising:

a demodulator which adjusts a frequency and a phase of an input carrier to demodulate an original signal therefrom;

a signal decision unit which decides an output signal from said demodulator as a specified symbol;

a phase error detector which receives the output signal from said demodulator and an output signal from said signal decision unit and detects a phase error between the received signals using bit shifting instead of division;

a loop filter which low pass filters an output signal from said phase error detector; and a voltage controlled oscillator which outputs a signal to adjust the frequency and phase of the input carrier to said demodulator in response to an output signal from said loop filter, wherein said phase error detector includes:

a numerator calculator which receives the output signal from said demodulator and the output signal from said signal decision unit and calculates a numerator of a phase error calculation expression on the basis of addition and multiplication;

a logic combination unit which logically combines first and second components of the output signal from said signal decision unit; and a multiplexer which receives, through a plurality of input terminals, values obtained by bit-shifting an output value from said numerator calculator respectively with respect to all possible values of a denominator of the phase error calculation expression and selecting one of the received values most approximate to an actual value in response to an output signal from said logic combination unit.

2. A decision directed carrier recovery circuit comprising:

a demodulator which adjusts a frequency and a phase of an input carrier to demodulate an original signal therefrom;

a signal decision unit which decides an output signal from said demodulator as a specified symbol;

a phase error detector which receives the output signal from said demodulator and an output signal from said signal decision unit and detects a phase error between the received signals using bit shifting instead of division;

a loop filter which low pass filters an output signal from said phase error detector; and a voltage controlled oscillator which outputs a signal to adjust the frequency and phase of the input carrier to said demodulator in response to an output signal from said loop filter, wherein said phase error detection detector includes:

a numerator calculator which receives the output signal from said demodulator and the output signal from said signal decision unit and calculates a numerator of a phase error calculation expression on the basis of addition and multiplication;

a logic combination unit which logically combines first and second components of the output signal from said signal decision unit;

an adder which adds first and second ones of values obtained by bit-shifting an output value from said numerator calculator respectively with respect to all possible values of a denominator of the phase error calculation expression;

a subtracter which subtracts the first value and a third one of the values obtained by bit-shifting the output value from said numerator calculator respectively with respect to all the possible values of the denominator of the phase error calculation expression; and a multiplexer which receives through a plurality of input terminals, the values obtained by bit-shifting the output value from said numerator calculator respectively with respect to all the possible values of the denominator of the phase error calculation expression, an output value from said adder and an output value from said subtracter and selecting one of the received values most approximate to an actual value in response to an output signal from said logic combination unit.

3. A decision directed carrier recovery circuit comprising:

a demodulator which adjusts a frequency and a phase of an input carrier to demodulate an original signal therefrom;

a signal decision unit which decides an output signal from said demodulator as a specified symbol, said signal decision unit including a read only memory or a logical combination circuit;

phase error detector which receives the output signal from said demodulator and an output signal from said signal decision unit and detects a phase error between the received signals using bit shifting instead of division;

a loop filter which low pass filters an output signal from said phase error detector; and a voltage controlled oscillator which outputs a signal to adjust the frequency and phase of the input carrier to said demodulator in response to an output signal from said loop filter, wherein said phase error detector includes:

a numerator calculator which receives the output signal from said demodulator and the output signal from said signal decision unit and calculates a numerator of a phase error calculation expression on the basis of addition and multiplication; and a multiplexer which receives, through a plurality of input terminals values, obtained by bit-shifting an output value from said numerator calculator respectively with respect to all possible values of a denominator of the phase error calculation expression and selecting one of the received values most approximate to an actual value in response to a control signal from said signal decision unit.

* * * * *